United States Patent
Santoski et al.

(10) Patent No.: US 8,666,800 B2
(45) Date of Patent: Mar. 4, 2014

(54) METHOD AND SYSTEM FOR PROVIDING GUIDANCE DATA

(75) Inventors: Robert J. Santoski, Montgomery, TX (US); Andre Lavoie, Boston, MA (US); Jonas Day Burton, Melrose, MA (US); Eric A. Larnard, Scituate, MA (US)

(73) Assignee: Thomson Financial LLC, New York, NY (US)

( * ) Notice: Subject to any disclaimer, the term of this patent is extended or adjusted under 35 U.S.C. 154(b) by 685 days.

(21) Appl. No.: 12/548,702

(22) Filed: Aug. 27, 2009

(65) Prior Publication Data

US 2009/0319343 A1 Dec. 24, 2009

Related U.S. Application Data

(63) Continuation of application No. 11/093,968, filed on Mar. 30, 2005, now abandoned.

(60) Provisional application No. 60/557,667, filed on Mar. 30, 2004.

(51) Int. Cl.
*G06Q 10/00* (2012.01)

(52) U.S. Cl.
USPC ............. 705/10; 705/35; 705/36 R; 705/37

(58) Field of Classification Search
USPC ................. 705/35, 36, 36 R, 37, 10
See application file for complete search history.

(56) References Cited

U.S. PATENT DOCUMENTS

| 7,603,308 B2 * | 10/2009 | Gatto ........................ 705/36 R |
| 2002/0077949 A1 | 6/2002 | Qasem et al. |
| 2002/0077950 A1 | 6/2002 | Chen et al. |
| 2002/0184131 A1 * | 12/2002 | Gatto ........................ 705/36 |
| 2003/0187719 A1 * | 10/2003 | Brocklebank ........... 705/10 |
| 2003/0225652 A1 | 12/2003 | Minow et al. |
| 2003/0229560 A1 | 12/2003 | Bourassa et al. |
| 2004/0039676 A1 * | 2/2004 | Trainer ..................... 705/36 |
| 2004/0093296 A1 * | 5/2004 | Phelan et al. ............ 705/36 |

FOREIGN PATENT DOCUMENTS

WO  WO-00/34911 A2  6/2000

\* cited by examiner

*Primary Examiner* — Nga B. Nguyen
(74) *Attorney, Agent, or Firm* — Covington & Burling LLP; Gregory S. Discher

(57) ABSTRACT

Described herein is a system and method for providing entity investment guidance via a communication network. The system includes a server, at least one entity-issued disclosure received by the server via the communication network and a storage accessible by the server. The storage includes at least one forecast data extracted from the at least one entity disclosure, said forecast data indicative of a projection of an entity performance parameter, and a context file for each of the forecast data, the context file including at least a portion of the entity disclosure associated with the forecast data. Also included in the system is a user interface in communication with the server, wherein the server generates an investment guidance display of the forecast data and the context file and transmits the display to the user interface via the communication network.

17 Claims, 5 Drawing Sheets

METHOD AND SYSTEM FOR PROVIDING GUIDANCE DATA

CROSS-REFERENCE TO RELATED APPLICATIONS

This application claims priority benefits under 35 §U.S.C. 119(e) of the U.S. Provisional Application No. 60/557,667, filed on Mar. 30, 2004.

FIELD OF THE INVENTION

The invention relates to investment decision-support systems, and more specifically to a system and method for the collection and delivery of investment guidance for one or more business entities.

BACKGROUND OF THE INVENTION

The securities industry in the United States is governed by a regulatory framework based on the concept that all investors and other interested parties should have access to certain basic facts about an investment prior to buying it. To achieve this, the Securities and Exchange Commission ("SEC") requires public corporations to disclose meaningful financial and other information to the public. In addition to what is required by the SEC, many corporations release a wide range of information to investors and other interested parties regarding the present and future performance of the corporation. Parties may then use this information to judge for themselves if a corporation's securities are a good investment.

Corporate financial guidance ("Guidance") is the primary means by which corporations communicate their plans, goals, and expectations to investors and other interested parties. Guidance may be conveyed through various events and mediums such as press releases, earnings conference calls, conference presentations, analyst meetings, and SEC filings. Guidance is most commonly conveyed in an unstructured format using written or spoken prepared text or as answers to analysts' questions.

Although the guidance is generally made public, there are few means in the investor-relations marketplace for investors or other interested parties to obtain comprehensive company-issued guidance from a single source. When company-issued guidance events and mediums are obtained, parties must sort through the large amount of information contained in the various events and mediums to determine the relevant guidance data.

It is therefore desired to provide a system and method for collecting and storing investment guidance data to enable investors and/or other interested parties to quickly access data relevant to their investment decision. It is a further desired to provide a system and method for providing context to the guidance data and a means to determine the accuracy and reliability of the guidance data.

SUMMARY OF THE INVENTION

According, it is an object of the present invention to provide a single-source comprehensive database of company-issued guidance or forecast data for delivery to investors and/or other interested parties.

It is a further object of the present invention to provide detailed and relevant guidance data to investors and/or other interested parties in a format that is substantially easier and faster than reading the guidance data source documents.

It is a further object of the present invention to provide the guidance data to investors and/or other interested parties with context to indicate the source of the guidance data.

It is a further object of the present invention to provide a guidance or forecast rating to provide investors and/or other interested parties with an indication of the reliability and accuracy of the guidance data receiving from a particular corporation or entity.

These and other objectives are achieved by providing a system for providing investment guidance via a communication network including a server, at least one entity-issued disclosure received by the server via the communication network, and a storage accessible by the server. The storage includes at least one forecast data extracted from the at least one entity disclosure, the forecast data indicative of a projection of an entity performance parameter, and a context file for each of the forecast data, the context file including at least a portion of the entity disclosure associated with the forecast data. Also included in the system is a user interface in communication with the server, wherein the server generates an investment guidance display of the forecast data and the context file and transmits the display to the user interface via the communication network.

Other objects of the present invention are achieved by provision of a system for providing entity investment guidance via a communication network, including a server, at least one entity-issued disclosure received by the server via the communication network, and a storage accessible by the server. The storage includes at least one forecast data extracted from the at least one entity disclosure, the forecast data indicative of a projection of an entity performance parameter, at least one actual data extracted from at least one entity disclosure, the actual data indicative of an actual entity performance parameter, and an entity forecast rating generated from a comparison of the forecast data to the actual data. Also included in the exemplary system is a user interface in communication with the server, wherein the server generates an investment guidance display of the forecast data, the actual data, and the entity forecast rating and transmits the display to the user interface via the communication network.

Further objects of the present invention are achieved by provision of a system for providing entity investment guidance via a communication network including a server, at least one entity-issued disclosure received by the server via the communication network, at least one analyst data received by the server via the communication network, the analyst data indicative of a projection of an entity performance parameter, and a storage accessible by the server. The storage includes at least one forecast data extracted from the at least one entity disclosure, the forecast data indicative of a projection of an entity performance parameter, the analyst data, and an entity forecast rating generated from a comparison of the forecast data to the analyst data. Further included in the system is a user interface in communication with the server, wherein the server generates an investment guidance display of the forecast data, the analyst data, and the entity forecast rating and transmits the display to the user interface via the communication network.

In some exemplary embodiments according to the present invention, the forecast data is partitioned in the storage based on a time period of the entity disclosure. Furthermore, the investment guidance display in some embodiments illustrates an initial set of the forecast data from a first portion of at least one of the time periods, which is presented in a first manner on the display, a revised set of the forecast data from a second portion of at least one of the time periods, which is presented in a second manner on the display, and a variance of the forecast data over each of the at least one of the time periods, which is presented in a third manner on the display. Additionally illustrated in some embodiments is the context file, the actual data, or the analyst data for the at least one of the time periods presented in a fourth manner on the display.

In other respects, the present invention is concerned with the provision of a method for providing investment guidance based on entity-issued disclosure, including the steps of receiving at least one entity-issued disclosure, generating a transcript of the at least one entity-issued disclosure, extracting a forecast data and an actual data from the transcript, and storing the forecast data and the actual data in a storage. Further included are the steps of generating an entity forecast rating based on a comparison of the forecast data to the actual data and generating an investment guidance display of the forecast data, actual data, and entity forecast rating.

Other objects, features and advantages according to the present invention will become apparent from the following detailed description of certain advantageous embodiments when read in conjunction with the accompanying drawings in which the same components are identified by the same reference numerals.

DETAILED DESCRIPTION OF THE DRAWINGS

Figure 1:
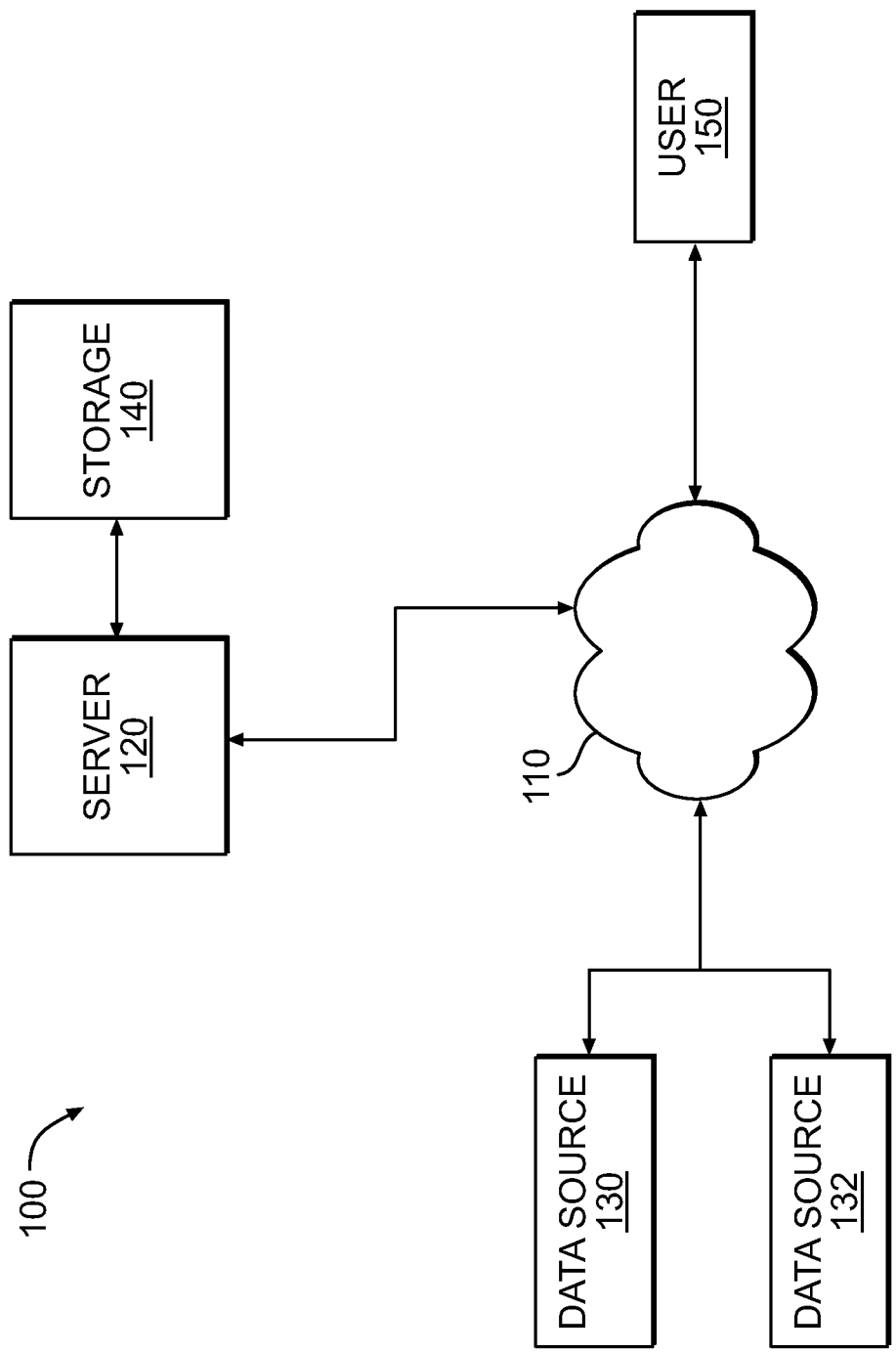
FIG. 1 is a schematic view of a system for providing entity investment guidance in accordance with one embodiment of the present invention.

FIG. 1 shows an exemplary embodiment of a system 100 for providing entity investment guidance according to the present invention. The system 100 includes a communication network 110. The communication network 110 may be, for example, the Internet. The system 100 further includes a server 120.

The system 100 includes at least one data source, e.g., data sources 130 and 132. The data source 130 may be an entity-issued data source transmitting at least one entity disclosure to the server via the communication network. The entity disclosure may be any means of providing entity or corporation-issued guidance including, for example, a press release, a publication, a conference call, or an SEC filing.

The system 100 preferably retrieves and processes all entity disclosures that may be of interest to investors and/or other interested parties. The entity disclosures may include, for example, projections and estimations of the corporation's financial performance (e.g., forecast data), actual financial performance (e.g., actual data), and non-financial information and any other type of investment guidance.

The entity disclosure may include quantitative or qualitative disclosures of an entity or corporation. For example, the entity disclosure may include a quantitative projection of a future earnings-per-share or "EPS" (e.g., we believe EPS in the $4^{th}$ quarter will be between $1.00 and $1.05) or a qualitative projection (e.g., we believe EPS will rise significantly in the $4^{th}$ quarter). The entity disclosure may further be in any format known to those of ordinary skill in the art, including, but not limited to, a written document, a computer file, a live audio or video transmission, an audio recording, and a video recording.

Some embodiments according to the present invention include the second data source 132, which may be an analyst data source transmitting at least one analyst data to the server via the communication network. The analyst data is indicative of a projection of an entity performance parameter (e.g., measure) provided by an analyst external to the entity. The entity performance parameter may include, but is not limited to, an earnings-per-share, a revenue, an income, a profit, a capital expenditure index ("CAPEX"), or a combination thereof.

Shown in FIG. 1, the system 100 includes a storage 140 accessible by the server. The storage may be any data storage means known to those of ordinary skill in the art. The storage 140 includes forecast data extracted from entity disclosures. The forecast data is indicative of a projection of an entity performance parameter. In some embodiments, the storage 140 further includes actual data extracted from the number of entity disclosures. The actual data is indicative of an actual entity performance parameter. In some other embodiments, the storage 140 also includes the above described analyst data.

The storage 140 may also include a context file for each of the forecast data. The context file includes a portion of the entity disclosure (or a hyperlink thereto) associated with the forecast data. The context file provides a user of the system 100 with context to the received quantitative and qualitative forecast data. For example, the context file may comprise a portion of text including the forecast data as extracted from a press release, conference call, or any other entity disclosure.

The storage 140 may include any number of partitions and/or databases. The storage 140 may include various partitions of data (e.g., forecast data, actual data, analyst data) sorted by the date on which the data was transmitted to the server or the time period to which the data refers. For example, the forecast data may be sorted by day, month, quarter, and/or fiscal year. The forecast data may be further partitioned to include provision for historical forecast data and/or actual data.

The storage 140 may also be partitioned or categorized by data type. For example, the storage 140 may include several data categories or classifications including, but not limited to: financial statement guidance or forecasts, industry outlook, legal disclosures, non-financial data, capital gains, and financing. Furthermore, the storage 140 may include data relating to any number of entities. Such entities may then be categorized or classified in the storage 140 based on an industry sector (e.g., using Global Industry Classification Standards ("GICS") industry codes). For example, entity categories may include: energy, materials, industrials, consumer discretionary, consumer staples, healthcare, financials, information technology, telecommunication services, and utilities.

Some exemplary embodiments of the system 100 may generate one or more entity forecast ratings and store the entity forecast rating(s) in the storage 140. The forecast rating provides a user with a means to determine the reliability or accuracy of the forecast data, i.e., which entities give historically good forecasts or guidance, and which continually miss forecast estimates. For example, a first entity forecast rating may be generated from a comparison of the forecast data to the actual data. Additionally, a second entity forecast rating may be generated from a comparison of the forecast data to the analyst data. The entity forecast ratings are stored in the storage 140.

Further included in the system 100 is at least one user interface 150 in communication with the server. The user interface 150 may include a computer, a monitor, and/or any other user interface known to those of ordinary skill in the art. The user interface 150 allows a user to access the system 100 and the various data described above. Furthermore, the user interface 150 allows a user to receive and view information, such as an investment guidance display as generated by the server 120 and transmitted to the user interface 150. A user may receive other information via the user interface such as alerts. Alerts may include the announcement (e.g., via email) of a new entity disclosure, new forecast data, new actual date, and/or new analyst data.

The investment guidance display may be transmitted to the user interface via a website or Internet browser accessed through the communication network (e.g., Microsoft Internet Explorer or Apple Safari). The investment guidance display may also be transmitted to the user interface 150 via email. In some embodiments of the present invention, a user may specify a frequency for which to receive an investment guidance display, or other information in the storage 140, via email. For example, the investment guidance display according to the present invention may include a selectable characteristic (not shown) for defining one or more time periods for which to transmit the display. A user may choose to receive the display or other information at a specified time each day (e.g., at market closing).

Figure 2:
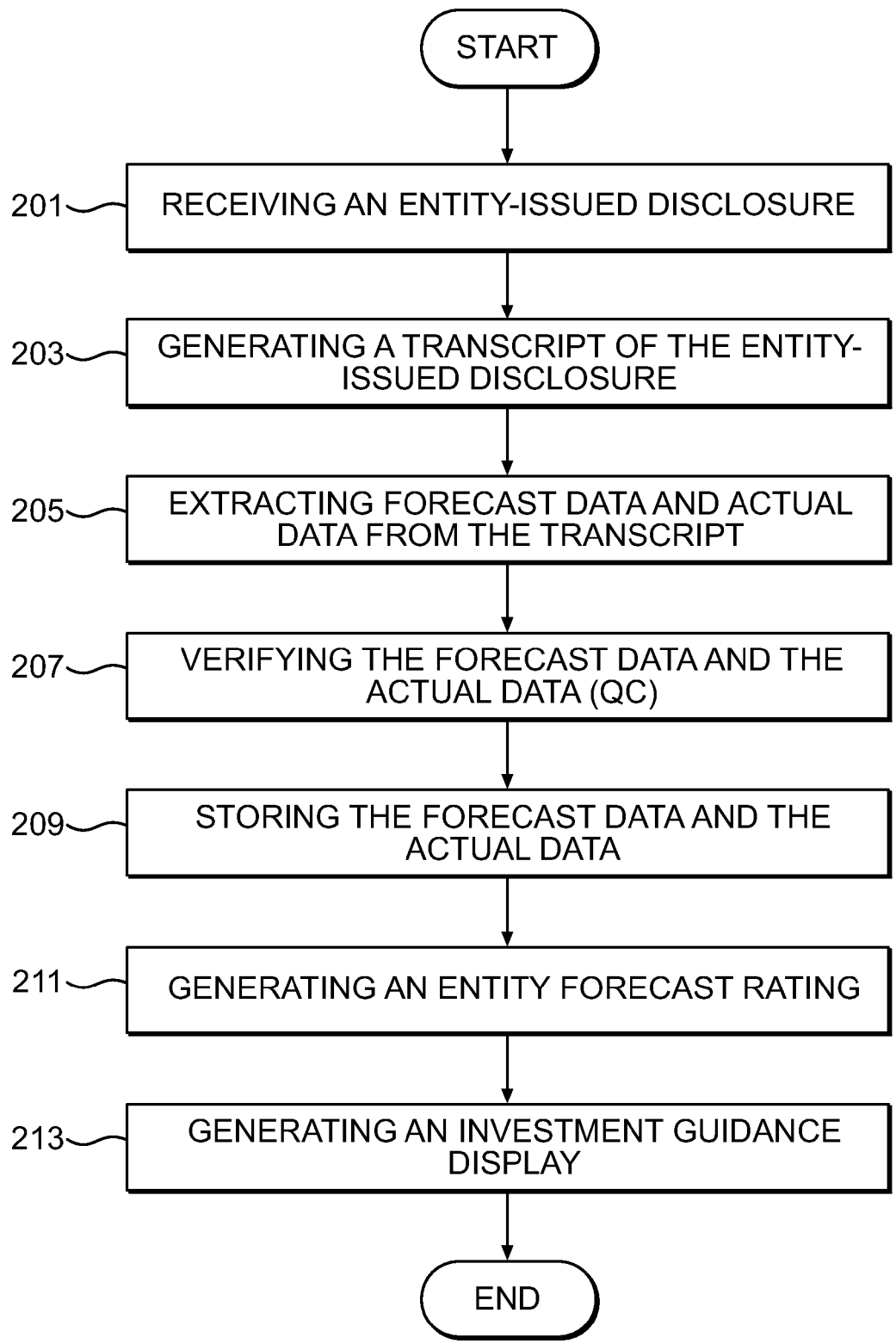
FIG. 2 is an exemplary flow chart illustrating a method for providing investment guidance based on entity disclosures employed by the system of FIG. 1.

FIG. 2 shows an exemplary flow chart illustrating a method 200 for providing investment guidance based on entity disclosures employed by the system of FIG. 1. The method 200 is described with reference to the system 100 shown in FIG. 1. However, the method 200 may be used in combination with other similar systems and/or apparatuses known to those of skill in the art.

The method 200 includes a first step 201 of receiving or scheduling at least one entity disclosure. Scheduling includes finding qualifying future entity disclosures (e.g., events, press releases, conference calls, SEC filings, etc). The step may also include determining if an entity disclosure should be processed and reevaluating already scheduled entity disclosures based on changes in data. In some embodiments, step 201 may further include transmitting an alert or otherwise notifying administrators of the system 100 of an upcoming entity disclosure.

Step 203 of the method 200 includes generating a transcript of the entity disclosure. For example, an audio or video entity disclosure may be converted into a text transcript to facilitate processing. The step 203 may be a virtual step of receiving a transcript if a particular entity disclosure already exists in text format.

Step 205 includes extracting forecast data and actual data from the transcript. For example, the content of the disclosure event may be broken down into portions and each portion identified as candidates for containing relevant forecast and/or actual data. The forecast and/or actual data is then extracted from the entity disclosure. In some embodiments, non-financial data may further be extracted.

An optional step 207 of verifying the forecast data and the actual data may be included in the method 200. For example, a quality control ("QC") process may be performed on the data. The system may determine if QC is necessary or determine that the step 207 may be skipped. Step 207 may result in changes or corrections to the data.

The forecast data and actual data is then stored (e.g., absorbed) into a storage (step 209). The step 209 may include a selection of the relevant time period of the data, an inputting of one or more values for the data, and the inputting of a basis of the values. For example, a forecast data such as a projected earnings-per-share may be stored as an individual value or a range of values referring to a particular time period (e.g., a current or upcoming quarter or fiscal year). The forecast data may include a basis (e.g., a context file), such as a reference or link to the particular entity disclosure from which the forecast data was extracted.

A further step of auditing the data (not shown) may follow the storage of the data. The step of auditing the data may include generating an audit report, reviewing the audit report, and identifying errors in the data. The data may then be corrected and the corrections stored in the storage. An explanatory comment may also be stored with the corrections.

Step 211 includes generating an entity forecast rating for the data. As described above, the entity forecast rating is based on a comparison of the forecast data to actual data. In some embodiments, the entity forecast rating may be based on a comparison of the forecast data to analyst data. The entity ratings are then stored in the storage. In step 213, an investment guidance display of the forecast data, actual data, and entity forecast rating is generated.

Figure 3:
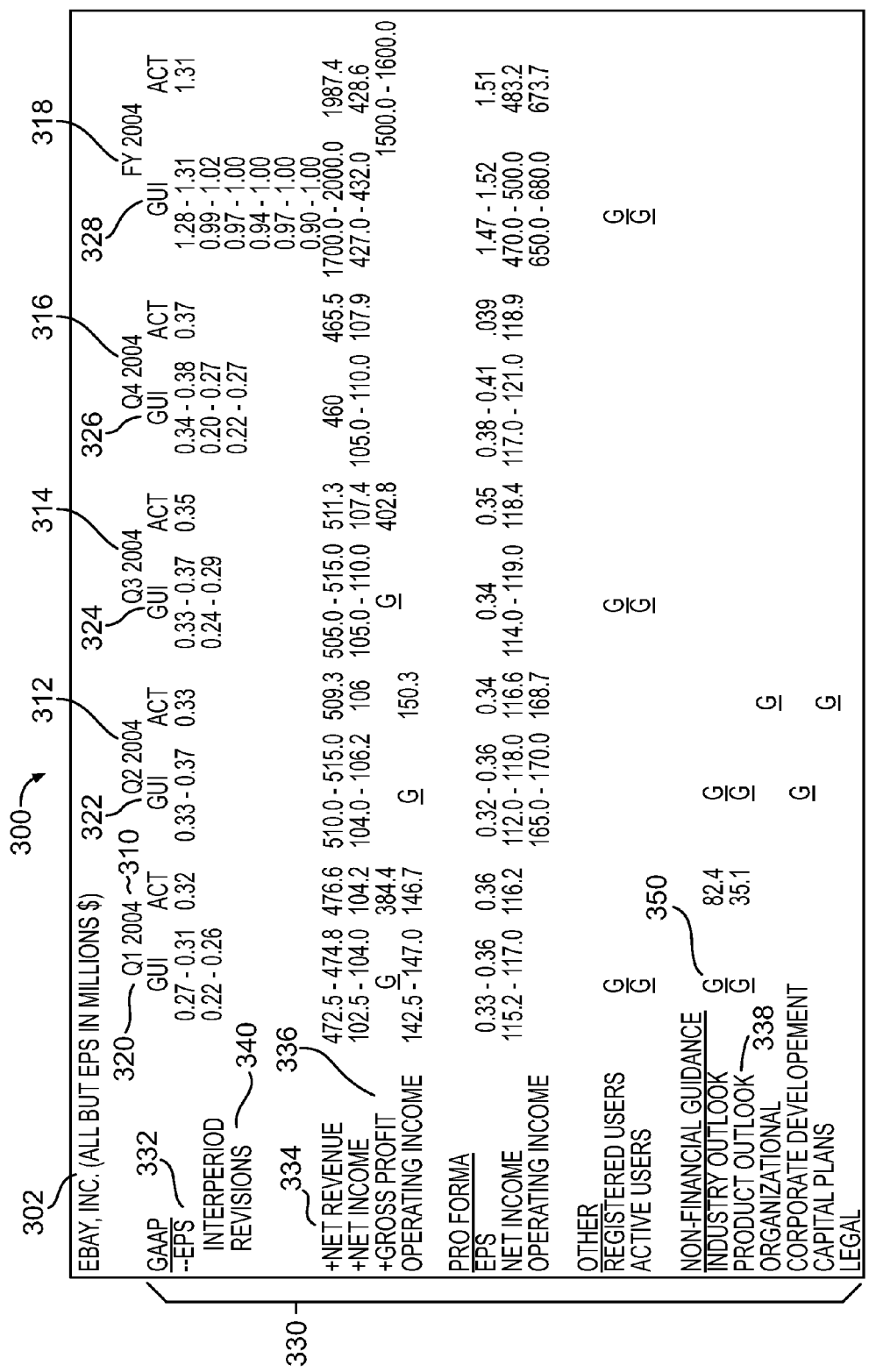
FIG. 3 is a screen shot of an exemplary investment guidance display generated by the system of FIG. 1.

FIG. 3 shows a screen shot of an exemplary investment guidance display 300 generated by the system of FIG. 1. The particular display 300 is a spreadsheet data display. The display has a title 302 including, for example, a company name, stock ticker symbol, and units information for the data. In some embodiments, the title 302 may also include an industry classification and/or sub-industry classifications of the entity.

The display 300 includes any number of columns (e.g., columns 310-318). The columns include headings 320-328 providing reference to the time periods for which forecast data and actual data is shown (e.g., Q1 2004 or the 1$^{st}$ Quarter of fiscal year 2004). The column headings 320-328 further include reference to the provision of forecast data (e.g., guidance or "GUI") and actual data ("ACT").

The display 300 further includes any number of rows 330 with each row including a data type heading (e.g., 332-338). For example, the data type heading 332, or "EPS," represents the provision of earnings-per-share data. Within the EPS row, forecast data and actual data is provided for each quarter of the fiscal year 2004. For example, the values 0.27-0.31 of forecast data are provided for the 1$^{st}$ quarter of 2004. As described above, such values of forecast data represent the forecast data in the storage 140 having been extracted from disclosure events.

The display 300 also includes provision for the display of a context file for each of the forecast data including at least a portion of the entity disclosure associated with the forecast data (not shown). For example, each of the forecast data represented on the display 300 may include a hyperlink to the associated context file. Alternatively, or in combination, the context file may appear on the display 300 when a user positions a computer mouse icon over the forecast data.

The Interperiod Revisions, or data type subheading 340, reference revisions to the projected EPS as extracted from subsequent disclosure events. Any number of Interperiod Revisions may be included in the display 300. For example, the display 300 shows values of forecast data for the 4$^{th}$ quarter of 2004 including EPS between 0.34 and 0.38. The forecast data was later revised (e.g., due to a subsequent disclosure event) to 0.20-0.27 and again to 0.22-0.27. As shown, the actual EPS at the end of the 4$^{th}$ quarter of 2004 was 0.37.

Further included in the rows 330 is "Non-Financial Guidance." As shown, the Non-Financial Guidance may include data type headings such as the data type heading 338 (or "Product Outlook"). The Non-Financial Guidance may further include Industry Outlook, Organizational, Corporate Development, Capital Plans, Legal, and any other known non-financial data type. The display 300 may provide a value or range of values for a quantitative non-financial data type (e.g., the Product Outlook or 338). However, the display 300 includes provision for the display qualitative or non-numeric data. For example, an icon 350 (e.g., "G") is provided to indicate the existence of non-numeric data and the icon 350 may include a hyperlink (or any other reference) to such data.

In some embodiments, the values shown in the display 300 are color coded (not shown) to reflect up and down trends. For example, the value(s) may be red if a particular data type (e.g., EPS) is currently on a down trend, green if the data type is on an up trend, or black if there is no present change in the data type.

Figure 4:
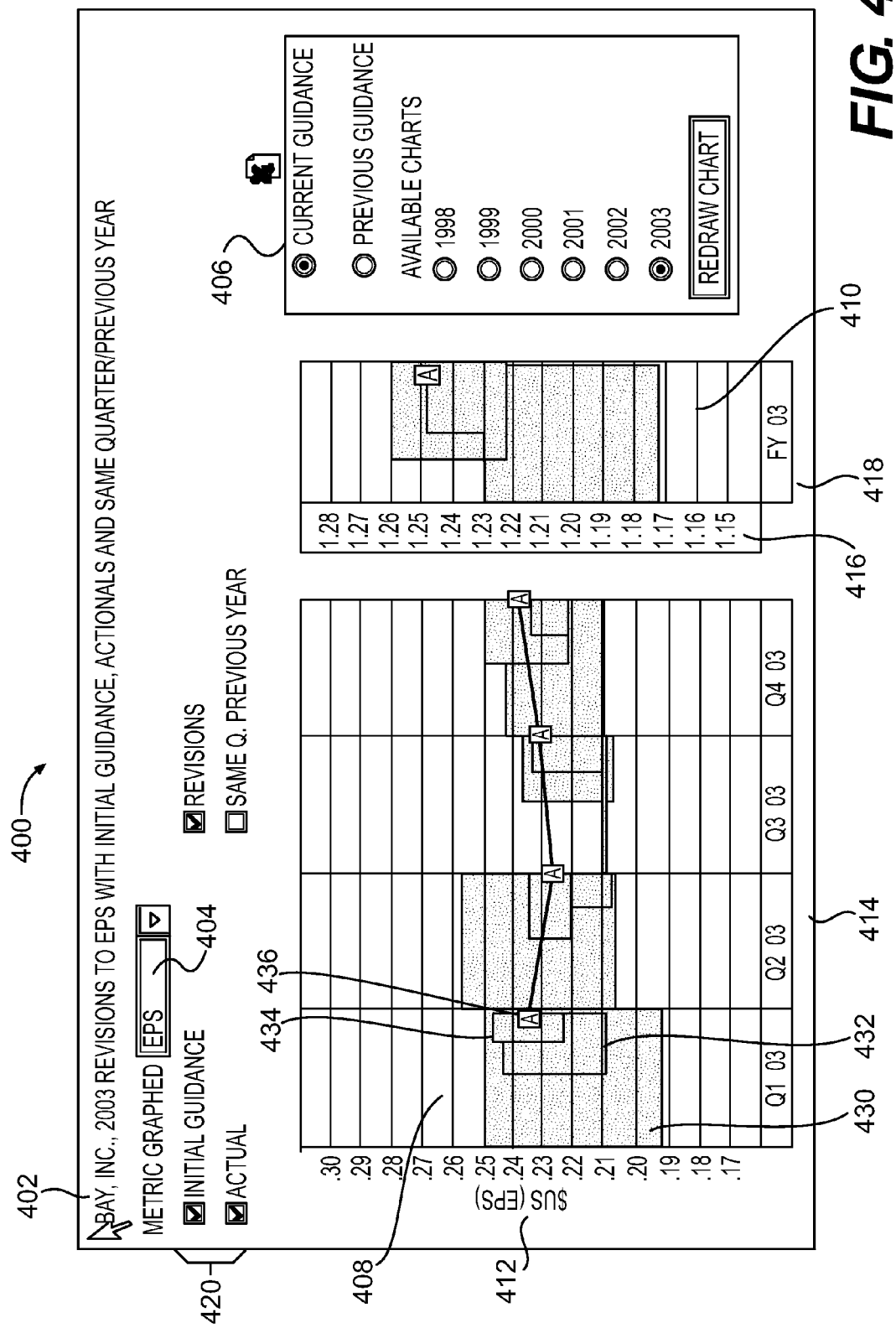
FIG. 4 is another screen shot of exemplary investment guidance display generated by the system of FIG. 1.

FIG. 4 shows another screen shot of an exemplary investment guidance display 400 generated by the system of FIG. 1. The particular display 400 is an "interactive chart" investment guidance display. The display 400 provides quantitative data from the storage 140 for the purpose of providing a visual context to the forecast and actual data. As one of ordinary skill in the art will understand, the interactive chart or display 400 may show the same data as a spreadsheet display (e.g., the display 300), although in a different form.

The display 400 includes a title 402, a data-type selector 404, and a time period selector 406. The display 400 further includes a first chart portion 408 and a second chart portion 410 (e.g., a focus period). A user may customize the display 400 by selecting a type of data via the data type selector 404. For example, a user may choose to display EPS, CAPEX, Total Revenue, EBITDA ("Earnings Before Interest, Tax, Depreciation and Amortization"), Operating Earnings, and/or Pro-Forma EPS on the display 400. When a data type is selected using the data type selector 404, a first Y-Axis header 412 displays the data type and the corresponding units of the data type. The range of the values in the first Y-Axis header 412 will vary depending on the specific data type. The display 400 also includes a corresponding first X-Axis header 414 displaying four periods of data (e.g., quarters or fiscal years).

Within the second chart portion 410, the display 400 includes a second Y-axis header 416 and a second X-Axis header 418. The second X-Axis header 418 includes only one period of data (e.g., one quarter or one fiscal year). Therefore, the second chart portion 410 may display data for a period equal to the total of the individual periods of first chart portion 408. Alternatively, the second chart portion 410 may display more detailed data for any one of the periods shown in the first chart portion 408.

As shown in the first chart portion 408, an initial set 430 of forecast data is displayed in a first manner (e.g., a shading). As one of ordinary skill in the art will understand, the initial set 430 represents forecast data including a projected EPS between 0.195 and 0.25 for the $1^{st}$ Quarter of 2003. Also provided in the first chart portion is a revised set 432 of the forecast data which is displayed in a second manner on the display. The revised set 432 represents forecast data including a projected EPS between 0.21 and 0.245. For example, the revised set 432 may be a result of a subsequent disclosure event in which the entity (e.g., eBay) issued a new projection of EPS for the $1^{st}$ quarter of 2003.

The position of the revised set 432 on the first chart portion 408 provides information as to the date on which the subsequent disclosure event was issued. As shown, the revised set 432 appears to have been extracted from a disclosure event issued at a time approximately half way through the $1^{st}$ quarter of 2003. The first chart portion 408 may further include any number of additional revised sets, such as the revised set 434.

The graphical representation of the initial set 430 and each of the revised sets 432 and 434 provides a user with a quick and easy representation of the variance of the forecast data over each of the quarters and the fiscal year. However, a numerical representation of the variance (e.g., as a percentage) may be further provided on the display 400.

Also shown in the display 400 is actual data for each of the quarters and the fiscal year (i.e., in the first chart portion 408 and the second chart portion 410 respectively). For example, actual data 436 representing an actual EPS of approximately 0.235 is shown for the $1^{st}$ quarter of 2003. As shown, the actual data 436 falls within each of the initial set 430 (i.e., the initial projected EPS) and the revised sets 432 and 434 (e.g., subsequent projected EPS).

As similarly described above in reference to FIG. 3, embodiments of the display 400 may further include provision for the display of a context file for each of the forecast data and/or actual data. The context file includes at least a portion of the entity disclosure associated with the forecast data. For example, each of the forecast data represented on the display 400 may include a hyperlink to the associated context file. Alternatively or in combination, the context file may appear on the display 400 when a user positions a computer mouse icon over the forecast data (e.g., "rollover text").

Figure 5:
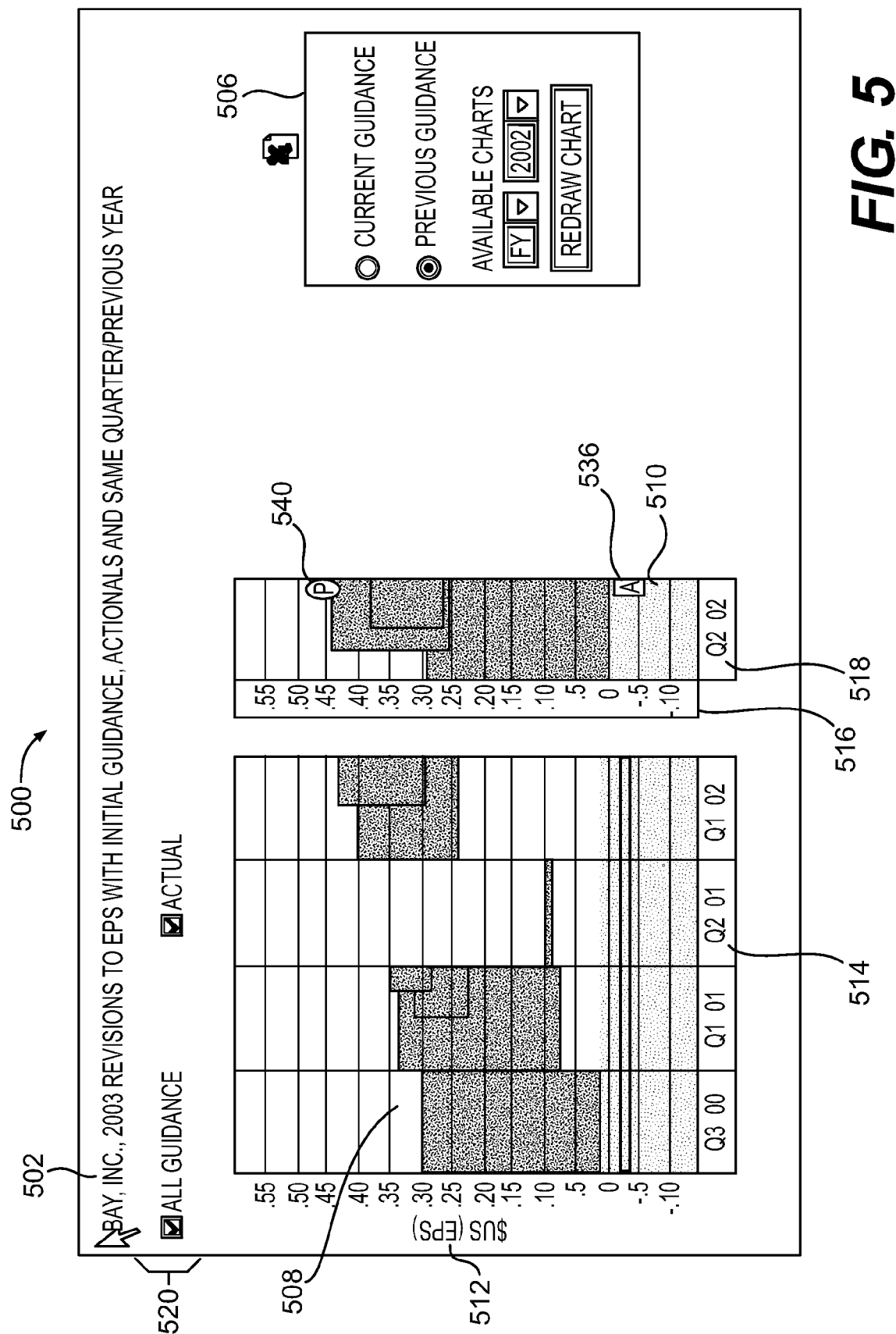
FIG. 5 is another screen shot of an exemplary investment guidance display generated by the system of FIG. 1.

FIG. 5 shows another screen shot of an exemplary investment guidance display 500 generated by the system of FIG. 1. Shown in FIGS. 4 and 5, the user may select a time period for which to display data (e.g., forecast, actual and analyst data) via the time selector 406/506. For example, the user may select "Current Guidance" (e.g., providing data for the current fiscal year) as shown in FIG. 4 or "Previous Guidance" (e.g., providing data for any prior fiscal year) as shown in FIG. 5. The user may select a previous year and/or a particular quarter within the previous year (shown in FIG. 5). When a current or previous time period is selected, the user may select "Redraw Chart" to regenerate the guidance data display 400/500 for the selected time period.

The displays 400 and 500 may further include an options selector 420 and 520, respectively. The options selector 420/520 allows the user to further customize the display 400/500 by choosing options such as "Initial Guidance," "Actual" or actual results, "Revisions," "Same Q. Previous Year" or same quarter in the previous year, and/or "All Guidance." For example, a user may select to display an actual value 540 of EPS from a previous year (shown as "P" on the second chart portion 510) (e.g., "P") as well as the actual value 536 for the current year. Furthermore, a user may selector to display analyst data and/or entity forecast ratings (not shown) on either of the FIG. 4 or 5.

Provision may be included in any of the displays 300-500 to include a selectable characteristic for defining a frequency for which to transmit the display to the user interface. For example, a user may select by what means and what frequency to receive forecast data, actual data, and/or any of the displays 300-500. For example, a user may choose to receive a display on demand in an Internet browser. The user may further choose to receive particular forecast data (e.g., "alerts") and/or a display via email at selected times and/or intervals (e.g., as disclosure events issue).

Advantages of the present invention include the provision of a single source for investors and/or other interested parties to access all entity-issued forecast data and actual data. The present invention further includes the advantageous provision of context to the entity-issued data.

A further advantage of the present invention is the provision of a forecast rating to provide investors and/or other interested parties with an indication of the reliability and accuracy of the guidance data receiving from a particular corporation or entity. The forecast rating, as well as other characteristics of the present invention, provide for comparison of forecast data against performance indicators such as analyst estimates and actual data.

Although the invention has been described with reference to a particular arrangement of parts, features and the like, these are not intended to exhaust all possible arrangements or features, and indeed many modifications and variations will be ascertainable to those of skill in the art.

What is claimed is:

1. A system for providing entity investment guidance via a communication network, said system comprising:
    a server;
    at least one entity-issued entity disclosure received by the server via the communication network;
    at least one analyst data received by the server via the communication network, said analyst data indicative of a projection of an entity performance parameter;
    a storage accessible by the server, said storage including:
        at least one forecast data extracted from the at least one entity disclosure, said forecast data indicative of a projection of the entity performance parameter,
        the analyst data, and
        an entity forecast rating generated from a comparison of the forecast data to the analyst data, wherein the entity forecast rating indicates the reliability and accuracy of the forecast data; and
    a user interface in communication with the server,
        wherein the server generates an investment guidance display of the forecast data, the analyst data, and the entity forecast rating, and transmits the display to the user interface via the communication network.

2. The system according to claim 1, wherein the forecast data is partitioned in the storage based on a time period of the entity disclosure.

3. The system according to claim 2, wherein the time period is selected from a group consisting of a quarter and a fiscal year.

4. The system according to claim 2, further comprising:
    a first selectable characteristic displayed on said user interface and in communication with said server, said first selectable characteristic for defining at least one of the time periods for which to display the forecast data, the analyst data, and the entity forecast rating.

5. The system according to claim 2, wherein the investment guidance display illustrates the following:
    an initial set of the forecast data from a first portion of at least one of the time periods, which is presented in a first manner on the display,
    a revised set of the forecast data from a second portion of at least one of the time periods, which is presented in a second manner on the display,
    a variance of the forecast data over each of the at least one of the time periods, which is presented in a third manner on the display, and
    the analyst data for the at least one of the time periods, which is presented in a fourth manner on the display.

6. The system according to claim 1, wherein the investment guidance display is transmitted to the user interface via email.

7. The system according to claim 4, further comprising:
    a second selectable characteristic displayed on said interface and in communication with said server, said first selectable characteristic for selecting user preferences and defining a frequency for which to transmit the display to the user interface.

8. A system for providing entity investment guidance via a communication network, comprising:
    a server;
    at least one entity-issued entity disclosure pertaining to a securities and exchange commission filing received by the server via the communication network;
    at least one analyst data received by the server via the communication network, said analyst data indicative of a projection of an entity performance parameter comprising an earnings-per-share statement and provided by an analyst external to the entity issuing the entity disclosure;
    a storage accessible by the server, said storage including:
        at least one forecast data extracted from the at least one entity disclosure, said forecast data indicative of a projection of an entity performance parameter,
        at least one actual data extracted from the at least one entity disclosure, said actual data indicative of an actual entity performance parameter,
        the analyst data,
        a first entity forecast rating generated from a comparison of the forecast data to the actual data,
        a second entity forecast rating generated from a comparison of the forecast data to the analyst data, and
    a user interface in communication with the server,
        wherein the server generates an investment guidance display of the forecast data, the actual data, the analyst data, and the first and second entity forecast ratings and transmits the display to the user interface via the communication network.

9. The system according to claim 5, wherein the initial set of the forecast data, the revised set of the forecast data, the variance of the forecast data, and the analyst data are all presented simultaneously on the display.

10. The system according to claim 1, wherein the at least one entity-issued entity disclosure pertains to at least one of the group consisting of a press release, a publication, a conference call, and an SEC filing.

11. The system according to claim 1, wherein the entity performance parameter includes at least one of the group consisting of an earnings, an earnings-per-share, a revenue, an income, a profit, and a capital expenditure index.

12. The system according to claim 1, wherein the analyst data is provided by an analyst external to the entity issuing the entity disclosure.

13. The system according to claim 1, wherein the at least one entity-issued entity disclosure is selected from the group consisting of a written document, a live audio transmission, a live video transmission, an audio recording, and a video recording.

14. The system according to claim 13, wherein the entity-issued entity disclosure is converted into a text transcript.

15. The system according to claim 14, wherein the forecast data is extracted from the text transcript.

16. The system according to claim 1, wherein the analyst data and forecast data are each indicative of a future projection of the entity performance parameter.

17. The system according to claim 1, wherein the server further generates a display of a context file including at least a portion of the entity disclosure from which the forecast data was extracted, and wherein the server transmits the display of the context file to the user interface via the communication network.

* * * * *